May 5, 1953 F. FAULHABER 2,637,254
STRUT OR SPREADER SYSTEM FOR FOLDING PHOTOGRAPHIC CAMERAS
Filed May 2, 1951 4 Sheets-Sheet 1

INVENTOR.
FRITZ FAULHABER
BY Mock & Blum
ATTORNEYS.

May 5, 1953　　　　　F. FAULHABER　　　　2,637,254
STRUT OR SPREADER SYSTEM FOR FOLDING PHOTOGRAPHIC CAMERAS
Filed May 2, 1951　　　　　　　　　　　　4 Sheets-Sheet 2

INVENTOR.
FRITZ FAULHABER
BY Mark & Blum
ATTORNEYS.

INVENTOR.
FRITZ FAULHABER
BY Mack + Blum
ATTORNEYS

May 5, 1953 F. FAULHABER 2,637,254
STRUT OR SPREADER SYSTEM FOR FOLDING PHOTOGRAPHIC CAMERAS
Filed May 2, 1951 4 Sheets-Sheet 4
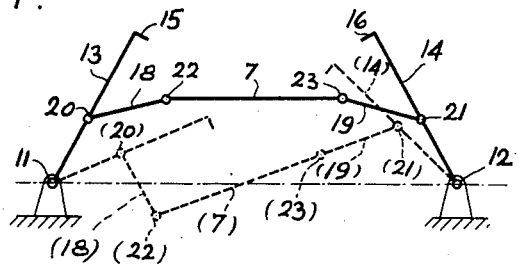
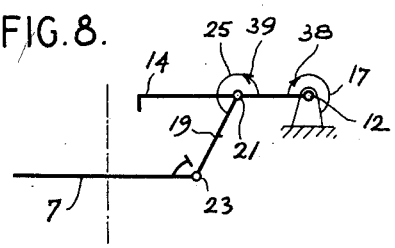
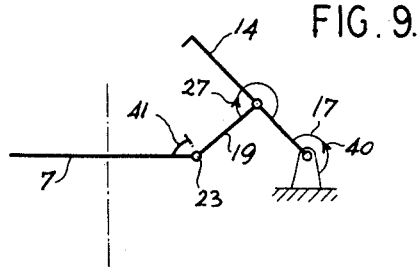
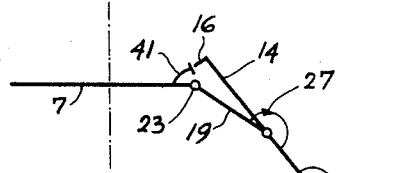
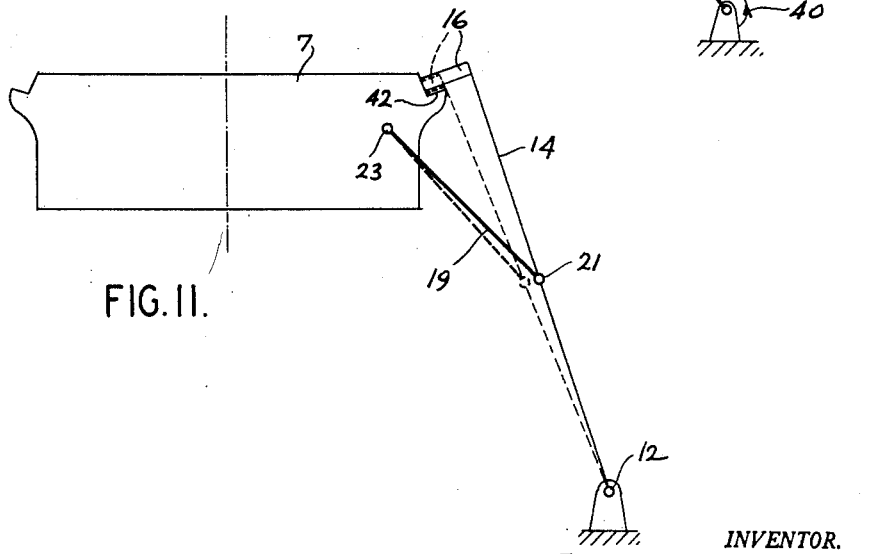
INVENTOR.
FRITZ FAULHABER.
BY Mock + Blum
ATTORNEYS Patented May 5, 1953

2,637,254

UNITED STATES PATENT OFFICE 2,637,254

STRUT OR SPREADER SYSTEM FOR FOLDING PHOTOGRAPHIC CAMERAS

Fritz Faulhaber, Schonthal, Germany, assignor to Voigtlander & Sohn Aktiengesellschaft, Braunschweig, Germany, a corporation of Germany Application May 2, 1951, Serial No. 224,103
In Switzerland May 5, 1950

12 Claims. (Cl. 95—39)

This invention relates to photographic cameras, in which the objective carrier is held in the position for taking pictures only by spreaders or struts, i. e. without the use of a base-board, and said spreaders are hinged to the camera casing and can be folded to the said casing so that, in combination with the cover flaps of the camera, which are connected with the spreaders, they act like a door which has two leaves elastically urged inward and covers the objective and its carrying means when the latter are retracted to the camera body in rest position. More particularly my invention relates to a new spreader arrangement to be used in photographic cameras of the before-mentioned type.

The main object of my present invention is to provide a spreader arrangement which is adapted to carry and guide the objective of the photographic camera from the rest position to the position for taking pictures and to safely hold the objective in this position.

Other objects and the advantages of the invention will be apparent from the appended drawings and claims and the following specification which describes by way of example and without limitation some embodiments of my invention.

According to the present invention, the spreader arrangement for cameras of the above mentioned type comprises two double lever gears, one gear for each of the two cover flaps. The gears are connected with each other by a coupling means consisting of the objective board. One of the levers of each double lever gear is linked to the camera casing or to a preferably frame-like or box-like member which can be displaced in connection with sharp focusing of the objective. This member is denoted "spreader box" in the following description. Said lever also carries the camera cover, directly or indirectly, and is denoted "cover spreader" or "cover strut" in the following. The other lever of the gear is rotatably linked to the cover spreader, at a point spaced from the turning point of the latter, and it is also linked to the objective carrier. It is denoted "drag spreader" in the following.

In carrying out their outward directed movement opposite to each other in opening the camera, the cover spreaders draw with them the drag spreaders so that the objective board suspended on the latter is caused to move forward from the camera casing. By affixing the drag spreaders to the cover spreaders at a point spaced from the turning point of the latter, parallelism and straightness of displacement of the objective board in the direction of the optical axis are secured. If the cover spreaders and drag spreaders would be linked at the same turning point, it could happen that the two levers connected by means of the objective board would move in the same sense and a lateral, parallel displacement of the objective board take place. But according to the present invention, movement of the two co-operating double levers takes place in opposite sense and, therefore, the objective is forced to remain in in its middle position during its advance.

The desired accuracy of the straight displacement of the objective carrier and the parallel movement of the bellows, are warranted also by the fact that the spreaders engage the objective board at four points. These four points form a quadrangle around the round central closure.

Straight movement can be safely attained also if only three points of engagement are present, for example two points relatively far from each other on one side, and the third opposite to them on the other side.

During advance of the objective board to the position for taking pictures, movement of the spreaders takes place as follows:

In the rest position of the objective in the camera, the drag spreader forms an acute angle with the free leg of the cover spreader. During spreading, this angle is first increased until the four turning points of the four spreaders or struts of a pair of levers, are located in a straight line. This is a point of reversal for the swinging movement of the drag spreaders, because subsequently the angle formed by the drag spreader and the free end of the cover spreader, decreases. If now a spring is caused to act on the drag spreader, which tends to turn the latter toward the free end of the cover spreader, the result will be that up to the before mentioned point of reversal or stationary point, the spring presses the objective board connected with the drag spreader into the camera casing—this is desirable when the camera is supposed to be closed—but after advancing beyond said point of reversal or tilting point, the objective board is advanced to the position for taking pictures—and this is desirable when the camera is opened.

There is a point of reversal also in the swinging movement of the cover spreaders. This point coincides, of course, with the corresponding point of the drag spreaders, because in the first phase described above, i. e. when the two ends of the spreaders move away from each other, the cover spreaders swing outward. After passing the point of reversal or stationary point, i. e. when the two ends of the spreaders move toward each other, the cover spreader swings somewhat inward until it engages the objective board advanced in the meantime, and stops the latter in the attained end position. The first part of the opening motion can be supported against the before mentioned inwardly acting spring effect on the drag spreader by a spring applied to the cover spreader, particularly in spring-cameras. However, such spring having the effect of outwardly urging the cover spreader, must be selected in such manner that it cannot prevent displacement of the objective board in the before mentioned second phase of movement.

The spring for causing opening of the cover spreaders is preferably arranged only on one side of the camera, i. e. on the side where the corresponding cover flap rests on an end portion of the underlying other cover flap. The drag spreader springs are fastened to the pivot of the drag spreader. This spring, which may be for example a cylindrical spiral spring, is preferably long and soft, i. e. it is provided with a great number of windings and has a rather flat character. By adjusting the character of the two springs to each other, it is possible to obtain a full scale of any kind and speed of opening the spreaders, such as advancing the objective board by hand from the stationary position into the end position, or holding the camera with the objective turned downward and causing opening by the weight of the objective, or rapid snapping up of the mechanism.

Thus, the mechanism used according to the present invention can be briefly described as follows:

The objective board is carried by two pairs of spreaders which are under the action of springs and are journalled in the so-called cover spreaders. These cover spreaders are pivotally connected to the so-called spreader box. Altogether, there is a six-link chain, in which two double-lever mechanisms are used, in the step of spreading. Then the cover spreaders engage the advanced objective board directly at the end of the movement, so that the drag spreader now represents the triangle side extending between the objective board and the cover spreader so that this triangle prevents any displacement of the objective board.

However, during the advance of the objective board, said chain of links is not stable in itself and its motion is not determined, because the drag spreaders could be tilted outward as well as inward. It is thus possible, for example, that the objective board is unilaterally displaced downward to an inclined lateral position and thus deviates from parallelism. In this connection, the critical point is the above mentioned tilting point of the drag spreader. The desired outward directed parallel motion of the objective board would be thus interrupted from now on. In order to avoid this, my invention contemplates in combination with the gears according to my invention, the arrangement of shears for securing the parallel course. In order to be capable of being folded to a completely flat condition, which is necessary for the rest position in the camera casing, one member of the shears is divided into two parts, each of which is linked at the common pivot of the shears on the sides of the undivided member of the shears. The shears must have sufficiently wide tolerances in order to be without forceful influence in the extended end position, not to participate in the locking step of the objective board, and to leave unaffected the tolerances and wear of the system.

The main advantages of the new construction according to my invention consist in that the objective board and the bellows advance in parallel position; the objective can be retracted up to the bottom of the camera; the character of the opening procedure can be determined by corresponding selection of the springs; only a minimum of space is needed, particularly in view of the fact that the four points of engagement of the spreaders on the objective board are arranged in a quadrangle around the round closure; during its advance, the objective is pressed against stop elements of the spreaders and the amount of advance can be, therefore, fixed with an accuracy of less than 1/100 mm. and is automatically compensated by appropriate selection of the angles and other mechanical dimensions of the spreaders; said accuracy is preserved in spite of wear and tear of the joints, as the wear of individual parts is irrelevant, because it is automatically compensated by the springs and changes of the angles.

In the enclosed drawings:

Figure 1 is a plan view of the upper narrow surface of a camera provided with a spreader arrangement according to the present invention. The camera shown belongs to the type, in which the objective and the elements carrying the same, when retracted into the camera body in rest position, are covered by two cover flaps acting like leaves of a door, while in the position for taking pictures the objective is caused by the spreaders to emerge from the camera casing and is held in this position by said cover flaps. This camera which has no base-board, is illustrated in closed position in Figure 1;

Figure 4:
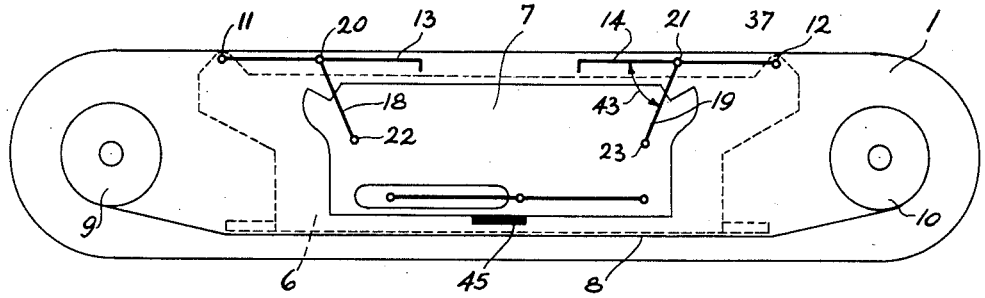
Figures 4, 5 and 6 illustrate diagrammatically the procedure of causing the objective carrier to emerge from the camera casing to the working position. For the sake of clearness the levers are shown as mere lines in Figures 4 and 5.
Figure 5:
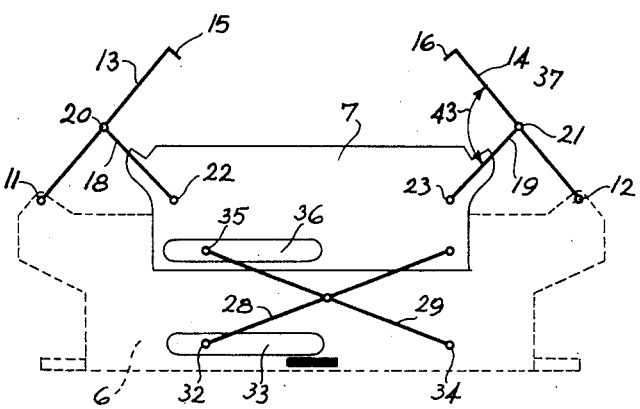
Figure 6:
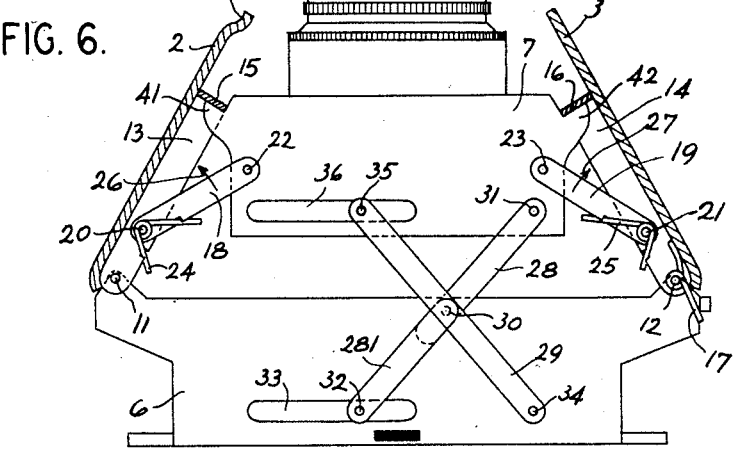

The camera casing and its parts are indicated only in Figure 4 and are omitted in Figures 5 and 6 for the sake of clearness;

Figure 7 indicates diagrammatically the strut or spreader mechanism and, in dotted line, an unintentional slipping off of the device, which is prevented by the present invention.

Figures 8, 9, 10 illustrate diagrammatically the effect of the springs in the spreader mechanism during the opening of the camera, and Figure 11 indicates diagrammatically the absence of an influence of wear on the operation of the spreader arrangement according to the invention.

Figure 3:
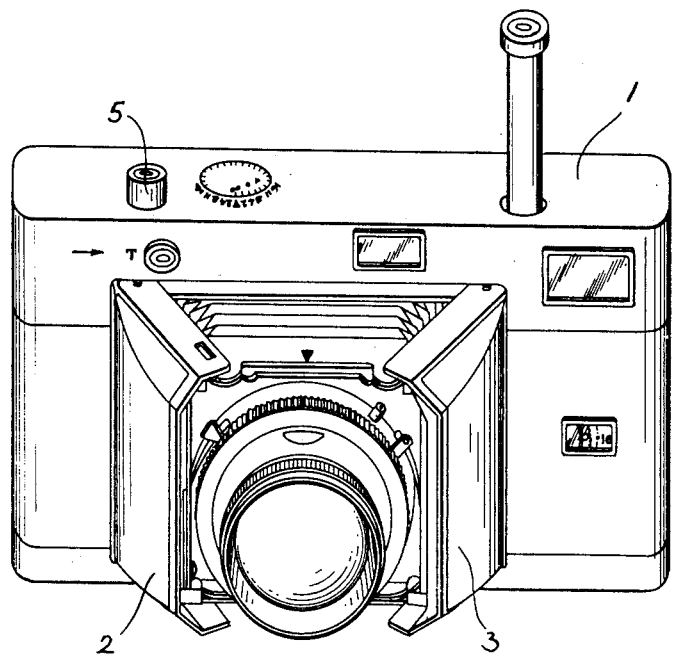
Figure 3 illustrates the camera in front view, the cover flaps being open and the objective in the position for taking pictures.

In the drawings, 1 denotes the camera casing and 2 and 3 denote the cover flaps acting like leaves of a door. One of these flaps (2) is provided with a half groove or the like (4), which is adapted to receive a ledge or the like on the end of the other flap (3) upon closing the camera. The camera is opened by exerting pressure on button 5 which projects from camera casing 1. Upon pressing button 5, the objective board 7 moves at once under spring action to the working position illustrated in Figures 3 and 6.

The camera shown by way of example in the enclosed drawings, which contains a spreader system according to the present invention, also contains a carrier 6 for the spreader. Said carrier is independent from the camera body and can be displaced in connection with the adjustment of the range finder by means of a gear not shown. This element 6 carries the objective board 7, to which the objective indicated in Figure 6 is fastened. This arrangement is constructed in such a manner that in the extended position the objective carrier 7 is held always at an exactly equal distance from carrier 6. Thus, in sharply focusing to the distance of the object, this whole rigid system is displaced relative to the camera body, which houses the light-sensitive photographic material, in accordance with the distance of the object.

9 and 10 denote the conventional spools for carrier 8 of the light-sensitive material.

Figure 1:
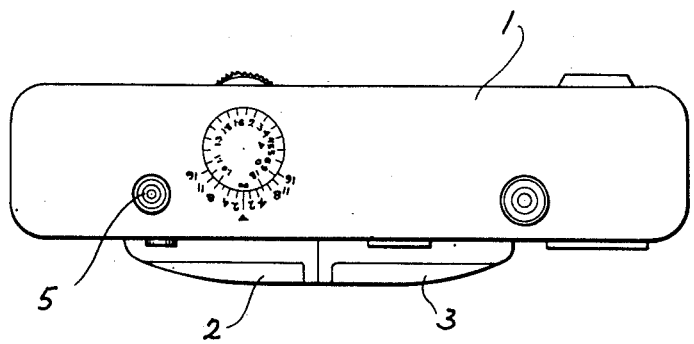
Figure 2:
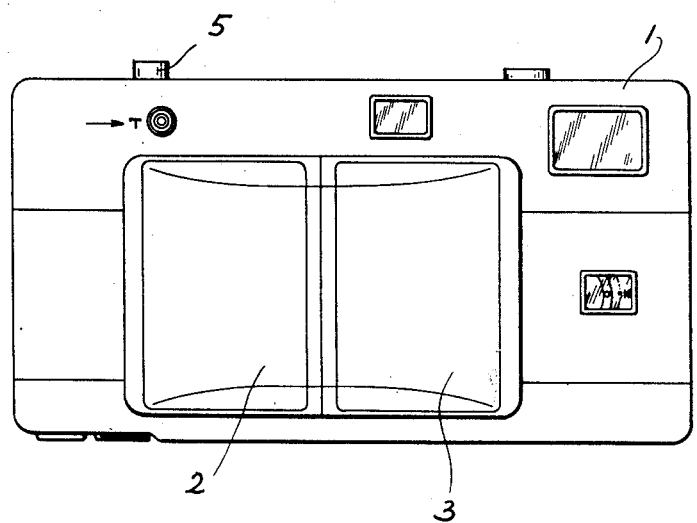
Figure 2 is a front view of the camera shown in Figure 1, likewise in closed position of the cover flaps.

As shown in Figure 4, objective board 7 can be completely retracted into box or carrier 6. A stop 45 limits retraction. Depending on the length of the objective used, the objective can be extensively retracted into the camera body. For example in the case of normal objectives of a small relative aperture, such as 1:3.5, the objective can be completely retracted into the camera body. In the case of objectives of higher light transmitting capacity, such as 1:2, the objectives are longer, so that the cover flaps 2 and 3 must be designed with a corresponding curvature, as shown in Figure 1.

Advance of the objective board 7 from spreader box 6 is effected by a gear designed according to the present invention. The struts or spreaders proper (13, 14) are pivotally linked at the four corner points of spreader box 6. Each cover flap is connected at the edge with two cover struts.

Only one pair of the spreader elements is shown in Figures 4–10 and reference numerals appear only for the elements shown in these figures, but it will be understood that the same spreader elements are present also at the back, in the direction of viewing the drawings. 11 and 12 are the before-mentioned pivots in spreader box 6, around which spreaders 13 and 14 are capable of swinging like levers. As shown in Figure 6, these spreaders 13, 14 are rigidly fastened to and carry the above mentioned cover flaps 2 and 3. Spreaders 13, 14 are provided at their free ends with stop elements 15 and 16, against which objective board 7 is elastically pressed in the extended position, as will be likewise understood from Figure 6.

The arrangement of springs for the automatic advance of the objective carrier, will be described in detail further below.

Of the two spreaders 13, 14 only spreader lever 14 is under the action of a torsional spring 17, at its point of rotation, while the other spreader 13 has no spring and is driven by the mechanism. This unilateral arrangement has the effect that cover flap 3 is first raised from half groove 4 of other cover flap 2 and thus opening of the camera starts without obstruction.

Drag spreaders 18, 19 are connected to levers 13, 14 acting as cover spreaders, by means of pivots 20, 21 according to my invention. The other end of levers 18, 19 is pivotally connected by means of pivots 22, 23, to objective board 7. Volute springs 24 and 25 are applied to pivots 20 and 21, and said springs 24 and 25 tend to turn struts 18 and 19, constantly in the direction of arrows 26 and 27, respectively. (See Figure 6).

A particular feature of this mechanism consists in that its members are connected without fine tolerances. Even wear and tear do not adversely affect operation of the mechanism.

As will be understood from Figures 4, 5 and 6, the two levers of the above described gear pass through a reversal point at points where the ends of drag spreaders 22 and 23 are nearest to the stationary points 11 and 12. This situation is shown in Figure 5. As at said points a kind of turning about takes place, it follows that the two-lever gear hitherto described is not capable of well defined safe operation yet. This is illustrated in more detail in Figure 7. It will be understood from the position of the elements shown in dotted line and the reference numerals placed in parentheses in Figure 7 that, instead of moving upward to the desired position shown in full lines, drag spreader 18 could be tilted over the dead-centre or tilting position (see Figure 5) shown in dotted line, without deformation of its structural members, also downward, so that objective board 7 would reach an inclined position, as shown in dotted line in Figure 7. This, however, must be prevented.

This is attained according to my invention by inserting in the mechanism shears containing two members 28 and 29 which are capable of swinging relative to each other and to carry out shearing movement around pivot point 30 in conventional manner.

Member 28 is subdivided. Part 281 is assembled with member 29 at pivot 30 in such manner that member 29 is located between the ends of said parts of member 28, which are always aligned in a straight line. In using this construction, the spreader mechanism can be completely retracted to the position shown in Figure 4.

Members 28 and 29 engage, on the one hand, spreader box 6, and, on the other hand, objective board 7. Lever 28 is pivotally connected at 31 to objective board 7, while the free end of lever 281 carries a bolt or the like 32, which is guided in an elongated slot 33 of spreader box 6. Furthermore, member 29 is capable of turning around stationary point 34 of spreader box 6, while its free end carries a pin or the like 35 which is guided in elongated slot 36 of objective carrier 7. The fixed pivotal points 31 and 34 of the shears are located on the right side, viewed in Figure 6, i. e. on that side of the spreader arrangement, on which cover strut or spreader 14 is acted on by spring 17.

The shears support objective board 7, so that tilting in the manner indicated in Figure 7, is safely prevented.

The function of the shears could be substituted, to a certain extent, by the use of an additional spring corresponding to spring 17, on pivot 11 of cover spreader 13. However, such mechanism would be delicate, because the two springs would have to be, and remain, adjusted to each other very exactly, while the use of shears in combination with my above described spreader system results in a mechanism which is substantially independent from wear and tear and from changes of the springs and is therefore reliable and safe.

Figures 8 and 9 illustrate the procedure of the cover spreader 14 being turned outward in the direction of arrow 38 by spring 17. Figure 8 indicates the position of the closed camera. Figure 9 corresponds diagrammatically to the position shown in Figure 5. The action of spring 17 is substantially ended here. Spring 25, which is shown in the present example as a cylindrical spiral spring having numerous windings and surrounding pivot 21 as a soft spring, has a very flat character without being weak. In folded condition of the camera (see Figure 8), said spring tends to press objective board 7 more and more in the direction of arrow 38, into the camera casing and spreader box 6. Thus, in order to swing the mechanism from the position shown in Figure 8 into the position illustrated in Figure 9, the effect of spring 17 must be sufficient for overcoming the effect of spring 25, which acts up to then in the direction 39, so that spring 17 provides for automatic snapping open of the camera. This can be easily attained by suitable selection of the springs. Beyond the repeatedly mentioned stationary point shown in Figures 5 and 9, spring 25 acts in the outward direction indicated by arrow 27. Spring 17 has a certain braking effect on this motion, because, beyond said point of tilting (see Figure 9), it acts in the direction of arrow 40, i. e. against spring 25 which acts there in the direction of the arrow. By suitable selection of spring 25 it can be attained without difficulty that movement of the objective board takes place with any desired speed, and, as already mentioned above, any desired speed of opening the camera can be attained according to my invention. Spring 25 presses arm 19 in the direction of the hands of a watch until stops 15, 16 of cover spreaders 13, 14 engage the corresponding stops, for example parts 41, 42 of objective board 7. Springs 24, 25 continue to act also in this situation and secure an exact position of objective board 7. This satisfactory position of taking pictures, of the objective board, maintained under pressing is still present even if certain elements are worn out. Figure 10 (see also Figure 6) illustrates the situation of objective board 7, shortly before stops 15, 16 of the cover spreaders engage registering stop elements 41, 42 of objective board 7.

In order to secure safe fit of said registering stops under all circumstances and to avoid interference by the effect of the shears, the latter are arranged to be operated not directly by the action of forces, but with play.

Independent compensation for the wear of the stop members of cover carriers 13, 14 on objective board 7, i. e. at points 16 and 42 (Figure 6) is attained by suitable dimensions of the individual spreader members in such manner that in movement of the cover carriers further inward, owing to wear of the stop members and the lowering connected therewith, of points 20 and 21 in the direction of the sensitive layer, spreaders 18, 19 form another angle, with the result of lifting the objective carrier by an equal amount.

Figure 11 diagrammatically illustrates this coaction. The original position of the spreaders is shown in full lines, while the changed position caused by a certain wear is indicated in dotted lines. The wear is indicated in this figure, by way of example, only by a shortened stop member 16. It involves in the same manner also the oppositely located sides of this stop member 16 and its contact surfaces with part 42.

While bearing points 12 and 23 are practically free from wear, owing to their strong construction including long bushings and pins, stop members 15, 16 of cover carriers 13, 14, which are latched to the objective board (41, 42) are subjected by grinding and impact to a higher wear which acts approximately proportionately also on pivot 21. Now, drag spreader 19 is dimensioned in such manner that a lowering, on account of wear, of point 21, would result in a slight lifting of point 23. However, in view of the empirically known wear of this pivot bearing 21, simultaneously a corresponding shortening of the effective length of spreader 19 occurs, which, in its reaction against the beforementioned lifting, has the effect of the pivot point 23 being kept in the same place as that occupied before said wear occurred. Thus, the end position of the objective board 7 is the same after the occurrence of wear as before.

Operation of the device can be briefly summarized as follows:

By releasing the lock of the camera, i. e. in the case of the above example by exerting pressure on button 5, the spreader arrangement of the invention starts to act. Spring 17 causes spreader 14 to swing outward in the direction of arrow 37 and thereby lifts at 4 cover part 3 connected therewith from the other cover part 2. The effect of spring 17 is at least of such magnitude that the objective board advances automatically to the stationary point diagrammatically indicated in Figure 5. Thereby, cover spreader 14 causes to swing drag spreader 19, which is pivotally coupled therewith at 21 and pivotally connected at its other end with objective board 7. By the advance of objective board 7 to the position shown in Figure 5, shears 28, 281, 29 are extended and the portion of objective board 7 shown on the left in the drawings is caused to advance upward by the same amount as the corresponding portion on the right, so that objective board 7 is advanced in strictly parallel position. Drag spreader 18, which is linked at 22 to the left part of objective board 7, presses cover spreader 13 so that the latter advances outward in the same manner as the corresponding spreader 14. The angle 43 formed by spreader 14 and spreader 18 increases during said movement. As explained above, outward motion of objective board 7 from the position shown in Figure 4 to the position in Figure 5, takes place on the action of spring 17 and against that of spring 25. The maximum point or end point of this motion is attained when cover spreaders 13, 14 and drag spreaders 18, 19 connected thereto, have formed the largest angle 43 and when the pivotal points 11—22—23—12 have formed a substantially straight line, as indicated in Figure 5.

If spring 17 is not forceful enough for causing snapping of the objective board beyond this stationary point shown in Figure 5, the advance movement is substantially ended in this position. Only slight outward displacement by hand of objective board 7, which can be easily gripped in this position, is necessary now. As soon as the stationary point, i. e. the tilting point for spreaders 18, 19 is passed, springs 24, 25 start to act in the manner described above in detail and cause drag spreaders 18, 19, with their ends 22 and 23 fastened to objective board 7, to advance toward cover spreaders 13, 14. Finally, stop elements 15, 16 of spreaders 13, 14, engage parts 41, 42 of objective board 7. The latter is undisplaceably held in this position by the continued action of springs 24, 25. The device remains in this stretched position now.

In order to close the camera, pressure is exerted by hand on objective carrier 7 in the direction of arrow 44. Thereby, drag spreaders 18, 19, are caused to swing around their pivotal points 22, 23, and, on account of their connection with cover spreaders 13, 14, they positively swing the latter outward to some extent. Stop elements 15, 16 are removed from parts 41, 42, and, simultaneously, angle 43 formed by cover spreaders 13, 14 and drag spreaders 18, 19, is increased until the larger angle shown in Figure 5 is attained. In this stationary point of all springs of my spreader system, the up to then inwardly pressing fingers can be lifted from objective board 7, and pressure can be exerted now on cover flaps 2, 3, from the outside. Under the action of this pressure, the objective board further advances, by parallel motion, inward and enters spreader box 6. This closing step is supported by springs 24, 25, in the manner described above in detail. It is true that spring 17 of cover spreader 14 shown on the right, opposes this tendence; but this opposing force can be overcome by a mild pressure by hand. Furthermore, in this step the spring has also the effect that in closing the camera, cover spreader 13, which is under no spring action, reaches the rest position sooner than spreader 14, so that cover parts 2 and 3 come to lie one above the other in the correct position. The guide effect provided by shears 28, 29, limits this advance of cover part 3 in the necessary manner.

The cover is automatically locked in its closing position. This can be effected by any suitable means which do not form part of the present invention. In the example of the present application, after snapping the ends of cover parts 2, 3, one upon another, further advance of the closed cover into the camera casing is caused by a reduced pressure and, in this way, locking takes place, which can be subsequently released again by the action of pressure on knob 5.

It will be understood from the above description and the drawings that movements of the cover parts 2, 3 and cover spreaders 13, 14 are completely coupled with each other, and said spreaders are directly connected to said cover parts. The objective board 7 is connected with cover spreaders 13, 14 in such manner that the objective board is caused to advance straight forward upon swinging of cover parts 2, 3 to the open position of the camera. In the closed position of the camera, drag spreaders 18, 19 form acute angles with cover spreaders 13, 14. These acute angles are first increased when the objective is caused to advance and are then decreased again until cover spreaders 13, 14, engage objective board 7, cover spreaders 13, 14 swinging first outward around their pivotal points 11, 12 to a certain extent and then swinging inward until they engage the objective board. As shown in the appended drawings and the above description, the point of reversal in the movement of the spreader system is reached when the pivotal points 11, 12 of the cover spreaders and the points of engagement 22, 23 of the drag spreaders 18, 19 in the objective board form a straight line (11—22—23—12), which forms an angle of 90° with the optical axis. (See Figure 5.)

It will be also understood that in operating the device of my invention, oppositely directed equal movements are carried out by the cover spreaders 13, 14 and drag spreaders 18, 19 of the oppositely and symmetrically arranged double lever units.

Spring 17 of cover spreader 14 and springs 20, 21 of the drag spreaders are selected in such manner that during the period from the start of the opening movement until reaching the point of reversal, shown in Figure 5, the effect of spring 17 is preponderant over that of springs 20, 21, while after passing said point of reversal, springs 20, 21 act only against a relatively weak resistance of spring 17.

The term "spreader unit" is used in the present specification and claims to denote a unit comprising a cover spreader and a drag spreader connected therewith, while the term "spreader system" is used to denote the system comprising all cover spreaders and drag spreaders present in a structure embodying my invention.

It will be understood that this invention is not limited to the specific details described above and illustrated in the drawings, and may be carried out with various modifications. For example, instead of engaging the objective board and spreader box, the shears described may engage the objective board and the camera body. This and other modifications may be made without departing from the scope of the invention, as defined in the appended claims.

What I claim is:

1. A photographic camera of the type described, in which the objective and its carrying means are retractable into the camera body to a rest position and capable of being advanced from said body to a ready for use position, comprising in combination an objective fastened to an objective carrier; a camera front cover formed by two registering wings adapted to cover the objective lens in closed position and to be moved to an open position of the camera; a spreader system for causing movement of the objective and objective carrier from rest position to the ready for use position, said system comprising at least one pair of spreaders, each of which is connected to a cover wing, and consists of a one-armed lever pivotally connected at one of its ends to a camera part; links, each of which is connected to the objective carrier and to a spreader, for holding said carrier and causing the spreaders to swing away from the optical axis, in a first phase, and to move toward the optical axis, after passing a turning point, in a later phase of the movement of the objective carrier from rest position to the ready for use position of the objective.

2. A photographic camera as claimed in claim 1, in which the spreaders and links form at least one double gear arranged on both sides on the optical axis and the oppositely arranged gear elements carry out equal movements in opposite direction relative to each other, on opposite sides of the optical axis.

3. A photographic camera as claimed in claim 1, in which the links are connected with springs urging the links in the direction of the free ends of the spreaders, in order to bring about a tilting effect upon passing the turning point.

4. A photographic camera as claimed in claim 1, in which the links are connected with springs urging the links in the direction of the free ends of the spreaders, in order to bring about a tilting effect upon passing the turning point; said springs connected with the links being applied at the pivot of each link in the respective spreader and consisting of cylindrical spiral springs having numerous windings; at least one spreader being connected at its pivot with a torsional spring for urging the spreader to move in outward direction.

5. A photographic camera as claimed in claim 1, in which the links are connected with springs urging the links in the direction of the free ends of the spreaders, in order to bring about a tilting effect upon passing the turning point; said springs connected with the links being applied at the pivot of each link in the respective spreader and consisting of cylindrical spiral springs having numerous windings; one spreader, on the same side of the camera, in each spreader pair, being connected at its pivot with a torsional spring for urging the spreader to move in outward direction.

6. A photographic camera as claimed in claim 1, in which the links are connected with springs urging the links in the direction of the free ends of the spreaders, in order to bring about a tilting effect upon passing the turning point; said springs connected with the links being applied at the pivot of each link in the respective spreader and consisting of soft cylindrical spiral springs having numerous windings; one spreader, on the same side of the camera, in each spreader pair, being connected at its pivot with a hard torsional spring for urging the spreader to move in outward direction; the springs connected with links and with the spreaders, respectively, having impulses of different, predetermined magnitude, so that in said first phase of movement of the spreaders the impulse of said hard springs prevails over the soft springs of the links, which urge the objective carrier toward the interior of the camera, while in said second phase of movement, the soft springs act only against slight resistance of the springs connected with the spreaders.

7. A photographic camera as claimed in claim 1, in which two pairs of spreaders are used and said pairs are arranged on opposite sides of the optical axis.

8. A photographic camera of the type described, in which the objective and its carrying means are retractable into the camera body to a rest position and capable of being advanced from said body to a ready for use position, comprising in combination an objective fastened to an objective carrier; a camera front cover formed by two registering wings adapted to cover the objective lens in closed position and to be moved to an open position of the camera; a displaceable carrier member or spreader box, adapted to receive and being connected with the objective board; a spreader system for causing movement of the objective and objective carrier from rest position to the ready for use position, said system comprising at least one pair of spreaders, each of which is connected to a cover wing, and consists of a one-armed lever pivotally connected at one of its ends to said carrier member; links, each of which is connected to the objective carrier and a spreader, for holding said carrier and causing the spreaders to swing away from the optical axis, in a first phase, and to move toward the optical axis, after passing a turning point, in a later phase of the movement of the objective carrier from rest position to the ready for use position of the objective.

9. A photographic camera as claimed in claim 8, including shears comprising two members having a common centrally arranged pivot, said shears engaging the objective board and the carrier member or spreader box, for preventing undesired tilting of the links.

10. A photographic camera as claimed in claim 8, including shears comprising two members having a common centrally arranged pivot, one of said members consisting of two aligned parts joined at the pivot, while the other member is located between the end of said aligned parts at the pivot, said shears engaging the objective board and the carrier member or spreader box, for preventing undesired tilting of the links.

11. A photographic camera as claimed in claim 8, including shears comprising two members having a common centrally arranged pivot, said shears engaging the objective board and the carrier member or spreader box, for preventing undesired tilting of the links, the objective, the objective carrier and the carrier member or spreader box forming a unit which is adjustable in the direction of the optical axis.

12. A photographic camera as claimed in claim 1, in which the free end portions of the spreaders are provided with stop members for limiting outward movement of the objective and objective carrier.

FRITZ FAULHABER.

References Cited in the file of this patent

UNITED STATES PATENTS

| Number | Name | Date |
|---|---|---|
| 966,886 | Boreux | Aug. 9, 1910 |
| 1,244,978 | Hales | Oct. 30, 1917 |
| 2,033,703 | Green | Mar. 10, 1936 |
| 2,047,257 | Crumrine | July 14, 1936 |